United States Patent
Wu

(10) Patent No.: US 12,022,508 B2
(45) Date of Patent: Jun. 25, 2024

(54) COMPETITION WINDOW SIZE DETERMINATION METHOD AND RELATED PRODUCT

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 413 days.

(21) Appl. No.: 17/412,162

(22) Filed: Aug. 25, 2021

(65) Prior Publication Data

US 2021/0385862 A1 Dec. 9, 2021

Related U.S. Application Data

(63) Continuation of application No. PCT/CN2019/080685, filed on Mar. 29, 2019.

(51) Int. Cl.
*H04W 74/0808* (2024.01)
*H04W 16/14* (2009.01)
*H04W 72/0446* (2023.01)
*H04W 74/0833* (2024.01)

(52) U.S. Cl.
CPC ....... *H04W 74/0808* (2013.01); *H04W 16/14* (2013.01); *H04W 72/0446* (2013.01); *H04W 74/0833* (2013.01)

(58) Field of Classification Search
None
See application file for complete search history.

(56) References Cited

U.S. PATENT DOCUMENTS

| 2017/0019909 | A1* | 1/2017 | Si | H04L 47/27 |
| 2018/0092128 | A1* | 3/2018 | Um | H04W 74/006 |
| 2018/0249484 | A1* | 8/2018 | Kim | H04W 74/0808 |
| 2019/0036831 | A1* | 1/2019 | Li | H04W 74/0816 |
| 2019/0037601 | A1* | 1/2019 | Noh | H04W 72/0446 |

(Continued)

FOREIGN PATENT DOCUMENTS

| CN | 107294662 A | 10/2017 |
| CN | 109005596 A | 12/2018 |

(Continued)

OTHER PUBLICATIONS

Extended European Search Report for European Application No. 19923448.5 issued Jan. 26, 2022. 9 pages.

(Continued)

*Primary Examiner* — Phirin Sam
(74) *Attorney, Agent, or Firm* — Perkins Coie LLP

(57) ABSTRACT

A competition window size determination method and a related product are disclosed in implementations of the present disclosure, wherein the method includes: determining a reference time unit on an unlicensed carrier; and determining a CWS on the unlicensed carrier according to the reference time unit. The implementations of the present disclosure can be used for determining or adjusting the CWS in a channel access scheme on the unlicensed carrier, to achieve friendly coexistence between systems on an unlicensed spectrum.

12 Claims, 4 Drawing Sheets

```
┌─────────────────────────────────────────────────────┐
│  A terminal device determines a reference time unit │ S201
│  on an unlicensed carrier                           │
└─────────────────────────────────────────────────────┘
                          │
                          ▼
┌─────────────────────────────────────────────────────┐
│ The terminal device determines a CWS on the         │ S202
│ unlicensed carrier according to the reference       │
│ time unit                                           │
└─────────────────────────────────────────────────────┘
```

(56) References Cited

U.S. PATENT DOCUMENTS

| | | | | |
|---|---|---|---|---|
| 2019/0149270 | A1* | 5/2019 | Liu | H04L 12/4035 |
| | | | | 370/329 |
| 2019/0289621 | A1* | 9/2019 | Li | H04W 72/1268 |
| 2020/0015094 | A1* | 1/2020 | Noh | H04W 72/23 |
| 2020/0015252 | A1* | 1/2020 | Kim | H04W 74/0816 |
| 2020/0100170 | A1* | 3/2020 | Babaei | H04W 74/0833 |
| 2020/0236709 | A1* | 7/2020 | Park | H04W 74/0816 |
| 2020/0260486 | A1* | 8/2020 | Zhou | H04L 1/1893 |
| 2021/0168859 | A1* | 6/2021 | Yang | H04W 76/11 |
| 2022/0131648 | A1* | 4/2022 | El Hamss | H04L 1/1812 |
| 2022/0264637 | A1* | 8/2022 | Wang | H04W 74/006 |
| 2023/0337247 | A1* | 10/2023 | Cirik | H04W 72/23 |
| 2023/0413317 | A1* | 12/2023 | Mukherjee | H04W 74/004 |
| 2024/0098785 | A1* | 3/2024 | Noh | H04W 74/0808 |

FOREIGN PATENT DOCUMENTS

| | | |
|---|---|---|
| CN | 109155720 A | 1/2019 |
| CN | 109417811 A | 3/2019 |
| EP | 3678444 A1 | 7/2020 |
| WO | 2017168258 A1 | 10/2017 |
| WO | 2019056368 A1 | 3/2019 |

OTHER PUBLICATIONS

Huawei et al. "Coexistence and channel access for NR unlicensed band operations" R1-1901525; 3GPP TSG RAN WG1 Meeting #96; Athens, Greece, Feb. 25-Mar. 1, 2019. 21 pages.
Examination Report for European Application No. 19923448.5 issued Sep. 28, 2022. 6 pages.
Huawei et al. "Coexistence and channel access for NR unlicensed band operations" R1-1900060; 3GPP TSG RAN WG1 Ad-Hoc Meeting 1901; Taipei; Jan. 21-25, 2019. 17 pages.
Lenovo et al. "Extensions for Channel Access Procedures" R1-1901135; 3GPP TSG RAN WG1 Ad-Hoc Meeting 1901; Tapei; Jan. 21-25, 2019. 4 pages.
LG Electronics "Channel access procedure for NR-U" 3GPP TSG RAN WG1 Meeting #96; R1-1902040; Athens, Greece; Feb. 25-Mar. 1, 2019. 15 pages.
LG Electronics "CWS adjustment for LAA" R1-166817; 3GPP TSG RAN WG1 Ad-Hoc Meeting 86; Gothenburg, Sweden; Aug. 22-25, 2016. 5 pages.
Notice of Reasons for Refusal for Japanese Application No. 2021-557112 issued Jul. 22, 2022. 8 pages with English translation.
3GPP TSG-RAN WG1 Meeting #83—R1-157305—Anaheim, USA, Nov. 15-22, 2015—Nokia Networks, CWS adaptation for DL LAA LBT (2 pages).
International Search Report issued Dec. 30, 2019 of PCT /CN2019/ 080685 (4 pages).
First Office Action for Chinese Application No. 2021109277166 issued Nov. 14, 2022. 12 pages with English translation.
Search Report for European Application No. 23192824.3 Issued Nov. 15, 2023, 10 Pages.
Samsung, Channel access procedures for NR-U, 3GPP TSG-RAN WG1 Meeting #96 Athens, Greece, Feb. 25-Mar. 1, 2019, R1-1902257.

* cited by examiner

COMPETITION WINDOW SIZE DETERMINATION METHOD AND RELATED PRODUCT

CROSS-REFERENCE TO RELATED APPLICATION

The present application is a continuation application of International PCT Application No. PCT/CN2019/080685, filed on Mar. 29, 2019, the entire content of which is hereby incorporated by reference.

TECHNICAL FIELD

The present disclosure relates to the field of communication technologies, and in particular, to a method for determining a contention window size, and a related product.

BACKGROUND

An unlicensed spectrum is a spectrum that is divided by countries and regions and may be used for radio device communication. The spectrum is generally considered as a shared spectrum, that is, communication devices in different communication systems can use the spectrum and may not apply for exclusive spectrum authorization from a government, as long as they meet a regulatory requirement on the spectrum set by the countries or the regions.

In order to enable various communication systems using an unlicensed spectrum for wireless communication to coexist amicably on this spectrum, some countries or regions have stipulated legal requirements that must be met for using an unlicensed spectrum. For example, the communication devices follow a "Listen Before Talk (LBT)" principle, that is, before transmitting signals on a channel of an unlicensed spectrum, the communication devices need to conduct channel sensing first, and the communication devices can transmit signals only when the result of channel sensing is that the channel is idle. If the result of channel sensing by the communication devices on an unlicensed spectrum channel is that the channel is busy, the communication devices cannot transmit signals.

A communication device performs channel sensing on an unlicensed carrier according to a Contention Window Size (CWS). However, an existing contention window size is determined based on a Long Term Evolution-Licensed-Assisted Access (LTE-LAA) system. Compared with the LTE-LAA system, an NR system on an unlicensed frequency band supports a more flexible slot structure, scheduling timing, and Hybrid Automatic Repeat (HARQ) timing. How to perform determination of a reference time unit and a contention window size in an NR-based access to unlicensed spectrum (NR-U) system in order to achieve friendly coexistence among various systems on an unlicensed spectrum is a problem to be solved urgently.

SUMMARY

Implementations of the present disclosure provide a method for determining a contention window size, and a related product, which may be used for performing determination or adjustment of a CWS in a channel access scheme on an unlicensed carrier to achieve friendly coexistence among various systems on the unlicensed spectrum.

In a first aspect, an implementation of the present disclosure provides a method for determining a CWS, which is applied to a terminal device, including: determining a reference time unit on an unlicensed carrier; and determining a CWS on the unlicensed carrier according to the reference time unit, wherein the CWS is used for performing channel sensing on the unlicensed carrier.

In a second aspect, an implementation of the present disclosure provides a terminal device. The terminal device has a function of implementing actions of the terminal device in designing of the above method. The functions may be implemented by hardware or by executing corresponding software through hardware. The hardware or software includes one or more modules corresponding to the above functions. In a possible design, the terminal device includes a processor, configured to support the terminal device to perform a corresponding function in the above method. Furthermore, the terminal device may further include a communication interface, configured to support communication between the terminal device and a network device. Furthermore, the terminal device may further include a memory, configured to couple with the processor. The memory stores necessary program instructions and data of the terminal device.

In a third aspect, an implementation of the present disclosure provides a terminal device, including a processor, a memory, and one or more programs, wherein the one or more programs are stored in the memory and configured to be executed by the processor, and the program includes instructions for executing acts as described in any method of the first aspect in the implementations of the present disclosure.

In a fourth aspect, an implementation of the present disclosure provides a computer-readable storage medium. The computer-readable storage medium stores a computer program for electronic data interchange, wherein the computer program enables a computer to execute all or part of acts as described in any method of the first aspect in the implementations of the present disclosure.

In a fifth aspect, an implementation of the present disclosure provides a computer program product, wherein the computer program product includes a non-transitory computer-readable storage medium storing a computer program, wherein the computer program is operable to enable a computer execute all or part of acts as described in any method of the first aspect in the implementations of the present disclosure. The computer program product may be a software installation package.

It may be seen that in implementations of the present disclosure, the terminal device determines the reference time unit on the unlicensed carrier, and determines the CWS in a channel access scheme on the unlicensed carrier according to the reference time unit, wherein the CWS is used for performing channel sensing on the unlicensed carrier, so as to achieve amicable coexistence among various systems on the unlicensed spectrum.

BRIEF DESCRIPTION OF DRAWINGS

The following is a brief description of accompanying drawings which are required for describing implementations or the prior art.

DETAILED DESCRIPTION

Technical solutions in implementations of the present disclosure will be described below clearly with reference to drawings in the implementations of the present disclosure. Apparently, the implementations described are only a part, but not all of implementations of the present disclosure. All other implementations obtained by those skilled in the art based on the implementations of the present disclosure without paying inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of the NR system, an LTE-based access to unlicensed spectrum (LTE-U) system, an NR-U system, a Universal Mobile Telecommunication System (UMTS), a Worldwide Interoperability for Microwave Access (WiMAX) communication system, Wireless Local Area Networks (WLAN), Wireless Fidelity (WiFi), a next generation communication system, or another communication system, etc.

Generally speaking, the number of connections supported by a traditional communication system is limited and easy to implement. However, with development of the communication technology, mobile communication systems will not only support traditional communication, but also support, for example, Device to Device (D2D) communication, Machine to Machine (M2M) communication, Machine Type Communication (MTC), or Vehicle to Vehicle (V2V) communication. The implementations of the present disclosure are also applicable to these communication systems.

Figure 1:
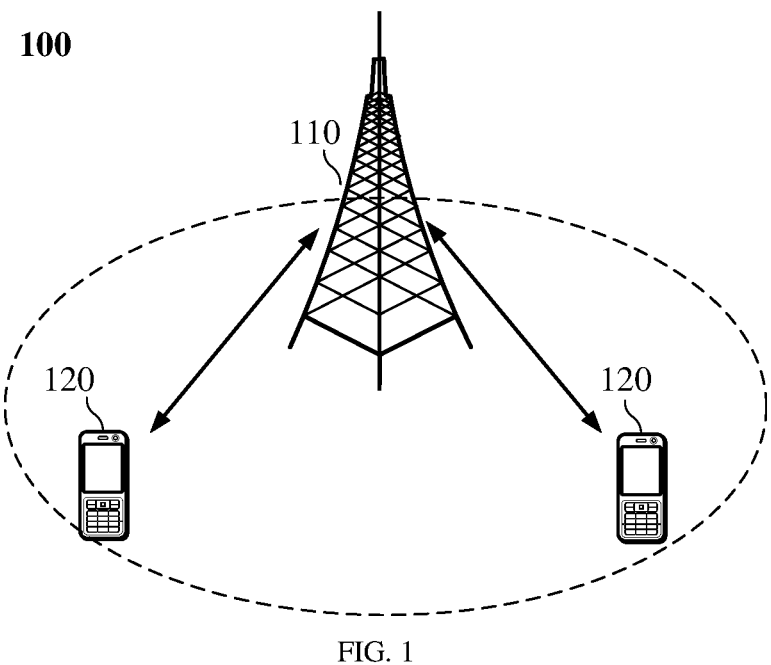
FIG. 1 is a schematic diagram of a structure of a possible communication system disclosed by an implementation of the present disclosure.

Illustratively, a communication system 100 applied in an implementation of the present disclosure is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The wireless communication system 100 further includes at least one terminal 120 located within the coverage range of the network device 110. As used herein, the term "terminal device" includes, but not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast transmitter; and/or another terminal device; and/or an Internet of Things (IoT) device. A terminal device configured to communicate via a wireless interface may be referred to as "a wireless communication terminal", "a wireless terminal" or "a mobile terminal". An example of the mobile terminal includes, but is not limited to, a satellite or cellular phone; a personal communication system (PCS) terminal capable of combining a cellular radio phone with data processing, facsimile, and data communication abilities; a personal digital assistant (PDA) that may include a radio phone, a pager, internet/intranet access, a Web browser, a memo pad, a calendar, a Global Positioning System (GPS) receiver; and a conventional laptop and/or palmtop receiver or other electronic devices including a radio phone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), etc.

Optionally, a device to device (D2D) communication may be performed between the terminal devices 120.

Optionally, the 5G system or 5G network may be referred to as a New Radio (NR) system or a NR network.

FIG. 1 exemplarily illustrates one network device and two terminal devices. Optionally, the communication system 100 may include multiple network devices, and other numbers of terminal devices may be included within the coverage range of each network device, which are not limited in the implementations of the present disclosure.

Optionally, the communication system 100 may include other network entities, such as a network controller and a mobile management entity, which are not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and terminal devices 120 which have communication functions, and the network device 110 and the terminal devices 120 may be the specific devices described above, and will not be described repeatedly herein. The communication device may also include other devices in the communication system 100, such as network controllers and mobile management entities and other network entities, which are not limited in the implementations of the present disclosure.

It should be understood that the terms "system" and "network" are often used interchangeably herein. The term "and/or" herein describes an association relation between associated objects only, indicating that there may be three relations, for example, A and/or B may indicate three cases: A alone, both A and B, and B alone. In addition, the symbol "/" herein generally indicates that there is an "or" relation between the associated objects before and after "/".

A method in an implementation of the present disclosure may be applied to communication on an unlicensed spectrum, or another communication scenario, such as a communication scenario on a licensed spectrum.

An unlicensed spectrum is a spectrum that is divided by countries and regions may be used for radio device communication. The spectrum may be considered as a shared spectrum, that is, communication devices in different communication systems can use the spectrum and may not apply for exclusive spectrum authorization from a government, as long as they meet a regulatory requirement on the spectrum set by the countries or the regions. In order to enable various communication systems using an unlicensed spectrum for wireless communication to coexist amicably on the spectrum, when performing communication on the unlicensed spectrum, a communication device may follow a principle of Listen Before Talk (LBT), that is, before transmitting a signal on a channel of the unlicensed spectrum, the communication device needs to conduct channel sensing (or referred to as channel sensing) first, and the communication device can transmit the signal only when a result of the channel sensing is that the channel is idle. If the result of channel listening performed by the communication device on the unlicensed spectrum is that the channel is busy, the signal cannot be transmitted. Optionally, a bandwidth of LBT is 20 MHz, or an integer multiple of 20 MHz.

In an implementation of the present disclosure, the communication device may use a corresponding channel access scheme for performing an LBT operation. For convenience of understanding, several channel access schemes are described below.

Category 1 (Cat-1 LBT): transmission is performed immediately after a switching gap ends, that is, it is not necessary to detect whether the channel is idle or not. The category 1 channel access scheme is suitable for transmission switching within a COT. The switching gap may not exceed a certain time duration, such as 16 μs.

Category 2 (Cat-2 LBT): it may be called LBT without random backoff. If the channel is idle within a single detection time, the signal may be transmitted, and if the channel is occupied, the signal cannot be transmitted.

Category 3 (Cat-3 LBT): LBT with random backoff based on a fixed Contention Window Size (CWS). At this time, the communication device determines a CWS as CWp, wherein CWp is a fixed value, and the communication device generates a random number N according to the value of CWp. The communication device performs channel sensing on the unlicensed spectrum, and may transmit the signal after successful channel sensing in all of N time slots.

Category 4 (Cat-4 LBT): LBT with random backoff based on a variable CWS. At this time, the communication device determines a CWS as CWp, wherein CWp is a variable value, and the communication device generates a random number N according to the value of CWp. The communication device performs channel sensing on the unlicensed spectrum, and may transmit the signal after successful channel sensing in all of N time slots.

It may be known through the above description that, Cat-3 LBT and Cat-4 LBT differs in whether the CWS is a fixed value or a variable value. More preferred channel access schemes may be Cat-1 LBT, Cat-2 LBT, and Cat-4 LBT.

In addition, in Cat-3 LBT and Cat-4 LBT, priorities of channel access schemes may be further distinguished according to priorities of transmission services. That is to say, Cat-3 LBT and Cat-4 LBT may have different channel access sub-schemes respectively, and different channel access sub-schemes may correspond to different priorities of service transmission.

TABLE 1

Uplink channel access parameters

| Channel access priority (p) | Backoff parameter | Minimum value of CWS | Maximum value of CWS | Maximum channel occupancy time | Adjustment range of CWS |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

As shown in Table 1, when the backoff parameter in the channel access sub-scheme is 2, the minimum CWS is 3, the maximum CWS is 7, and the maximum channel occupation time is 2 ms, the corresponding channel access priority is 1 (that is, the highest priority of Cat-4). When the backoff parameter in the channel access sub-scheme is 2, the minimum CWS is 7, the maximum CWS is 15, and the maximum channel occupation time is 4 ms, the corresponding channel access priority is 2. When the backoff parameter in the channel access sub-scheme is 3, the minimum CWS is 15, the maximum CWS is 1023, and the maximum channel occupation time is 6 ms, or 10 ms, the corresponding channel access priority is 3. When the backoff parameter in the channel access sub-scheme is 7, the minimum CWS is 15, the maximum CWS is 1023, and the maximum channel occupation time is 6 ms, or 10 ms, the corresponding channel access priority is 4.

The implementation of the present disclosure is mainly applied to determination or adjustment of a CWS in a channel access process according to the channel access scheme of category 4.

In order to better understand the method for determining a CWS and a related product disclosed by the implementations of the present disclosure, related concepts of signal transmission on an unlicensed spectrum are described below.

CWS: it refers to a length of a contention window, which may be used for performing channel sensing on an unlicensed carrier.

Maximum Channel Occupancy Time (MCOT): it refers to an allowed maximum time duration of signal transmission using a channel of an unlicensed spectrum after LBT succeeds. There are different MCOTs under different channel access priorities. Exemplarily, a maximum value of MCOT at present may be 10 ms. It should be understood that, the MCOT is time occupied by the signal transmission.

Channel Occupancy Time (COT): it refers to a time duration of signal transmission using a channel of an unlicensed spectrum after LBT succeeds, wherein a channel occupied by a signal within the time duration may be discontinuous. Herein, one COT is less than or equal to 20 ms, and a time duration occupied by signal transmission within the COT is less than or equal to MCOT.

Channel Occupancy Time of a network device (gNB-initiated COT): it is also called COT initiated by the network device, and refers to one channel occupancy time obtained by the network device after LBT succeeds. In addition to downlink transmission, within the channel occupancy time of the network device, it may also be used for uplink transmission by a terminal device under a certain condition.

Channel Occupancy Time of a terminal device (UE-initiated COT): it is also called COT initiated by the terminal device, and refers to one channel occupancy time obtained by the terminal device after LBT succeeds.

DL transmission burst (DL burst): one group of downlink transmission (i.e., including one or more downlink transmissions) performed by a network device, wherein the group of downlink transmissions are continuous transmissions (i.e., there is no gap between the multiple downlink transmissions), or the group of downlink transmissions have a gap therebetween but the gap is less than or equal to a preset value, e.g., 16 μs. If a gap between two downlink transmissions performed by the network device is greater than a preset value, e.g., 16 μs, it is considered that the two downlink transmissions belong to two DL transmission opportunities.

UL transmission burst (UL burst): one group of uplink transmission (i.e., including one or more uplink transmissions) performed by a terminal device, wherein the group of uplink transmissions are continuous transmissions (i.e., there is no gap between the multiple uplink transmissions), or the group of uplink transmissions have a gap therebetween but the gap is less than or equal to a preset value, e.g., 16 μs. If a gap between two uplink transmissions performed by the UE is greater than a preset value, e.g., 16 μs, it is considered that the two uplink transmissions belong to two UL transmission opportunities.

Figure 2:
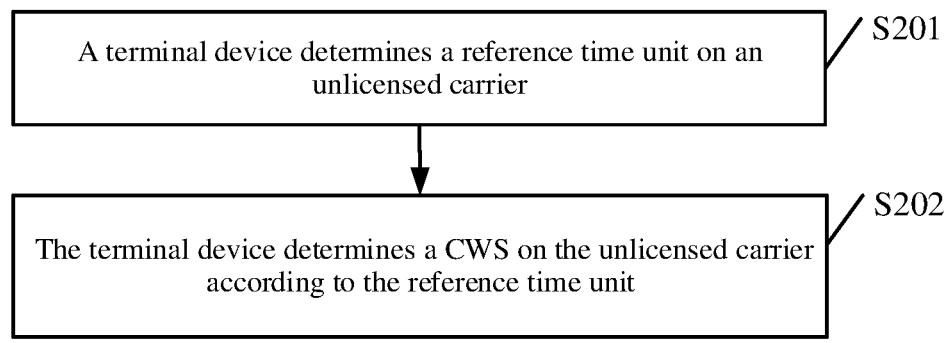
FIG. 2 is a schematic flowchart of a method for determining a CWS disclosed by an implementation of the present disclosure.

Based on the schematic diagram of the communication system shown in FIG. 1, please refer to FIG. 2, which is a schematic flowchart of a method for determining a CWS proposed by an implementation of the present disclosure. The method includes part or all of following contents.

In S201, a terminal device determines a reference time unit on an unlicensed carrier.

Herein, a time unit may include a subframe, a time slot, or a micro time slot, etc. A time duration of one subframe is 1 millisecond (ms), and one time slot includes 14 symbols. The micro time slot includes an integer number of symbols, for example, 2, 4, or 7 symbols.

Optionally, the reference time unit may include one or more time units.

In an implementation mode, the terminal device receives an Uplink Grant (a UL grant) or Downlink Feedback Information (DFI) on a first time domain resource, and the reference time unit may include a time unit in a first UL burst, wherein, a time duration between an ending position of the first UL burst and a starting position of the first time domain resource is greater than or equal to a first time domain duration, and the first UL burst is a latest UL burst before the first time domain resource, in other words, the first UL burst is a latest transmission burst meeting HARQ timing sequence. For example, the terminal device receives an uplink grant or downlink feedback information on the first time domain resource, which may trigger the terminal device to determine the reference time unit on the unlicensed carrier. In response to the uplink grant or the downlink feedback information received on the first time domain resource, the terminal device may determine that the reference time unit includes a time unit in the first UL burst.

Optionally, the first time domain duration may include at least one of following cases.

The first time domain duration is preconfigured or preset through a protocol.

The first time domain duration is sent by the network device to the terminal device through indication information. For example, the network device may send indication information to the terminal device, wherein the indication information is used for indicating the first time domain duration. The terminal device may obtain the first time domain duration according to the indication information.

The first time domain duration is associated with processing capacity of the network device. The processing capability of the network device may include decoding time of a transport block. The first time domain duration may be obtained according to the processing capability of the network device. For example, the terminal device may obtain the first time domain duration according to the decoding time of the transmission block.

The first time domain duration is associated with a channel access priority. For example, the first time domain duration is determined according to a correspondence relation between the channel access priority and the first time domain duration, and different channel access priorities correspond to different first time domain durations.

In an implementation mode, the reference time unit includes a time unit in the first UL burst, which may specifically be: the reference time unit includes a first time unit in the first UL burst; and/or, the reference time unit includes a first time unit transmitting a complete Physical Uplink shared Channel (PUSCH) in the first UL burst.

For example, the terminal device transmits a PUCCH on the first time unit in the first UL burst, and transmits a PUSCH on a second time unit to a last time unit in the first UL burst, then a first time unit transmitting a complete PUSCH in the first UL burst is the second time unit mentioned above.

Optionally, in an implementation of the present disclosure, the terminal device receiving the UL grant or the DFI includes: the terminal device receives the UL grant or the DFI through the unlicensed carrier, or the terminal device receives the UL grant or the DFI through an authorized carrier, or the terminal device receives the UL grant or the DFI through another unlicensed carrier except the unlicensed carrier.

In an implementation mode, the reference time unit may include a time unit in a second UL burst, wherein the terminal device does not receive an uplink grant or downlink feedback information sent by the network device within a second time domain duration after transmission of the second UL burst starts.

Optionally, the second time domain duration includes at least one of following condition.

The second time domain duration is preconfigured or preset through a protocol.

The second time domain duration is sent by the network device to the terminal device through indication information. For example, the network device may send indication information to the terminal device, wherein the indication information is used for indicating the second time domain duration. The terminal device may obtain the second time domain duration according to the indication information.

The second time domain duration is associated with processing capacity of the network device. The processing capability of the network device may include decoding time of a transport block. The second time domain duration may be obtained according to the processing capability of the network device. For example, the terminal device may obtain the second time domain duration according to the decoding time of the transmission block.

The second time domain duration is associated with a channel access priority. For example, the second time domain duration is determined according to a time domain duration of the second UL burst. For example, the second time domain duration K1=max (a channel sensing time corresponding to a CWS, the time domain duration of the second UL burst+K2), wherein K2 is a preset value or a value indicated by the network device to the terminal device. Optionally, a length of K2 is less than or equal to one time slot.

The second time domain duration is determined according to the channel sensing time corresponding to the CWS.

The second time domain duration is determined according to a correspondence relation between the channel access priority and the second time domain duration, and different channel access priorities correspond to different second time domain durations.

In an implementation mode, the reference time unit may include a first time unit in the second UL burst; and/or, the reference time unit may include a first time unit transmitting a complete PUSCH in the second UL burst.

If the terminal device does not receive an uplink grant or downlink feedback information sent by the network device within the second time domain duration after transmission of the second UL burst initiated by the terminal device starts, the terminal device may determine a first time unit or first two time units in the second UL burst as the reference time unit, and/or the terminal device may determine a first time unit transmitting a complete PUSCH in the second UL burst as the reference time unit.

For example, a Physical Random Access Channel (PRACH) is transmitted on the first time unit in the second UL burst, a Physical Uplink Control channel (PUCCH) is transmitted on a second time unit, a PUSCH is transmitted on a third time unit, then the reference time unit may include the third time unit.

In an implementation mode, the reference time unit may include a time unit for sending a random access preamble; and/or, a time unit for sending uplink control information.

Optionally, the time unit for sending the uplink control information includes a time unit for sending a PUCCH.

Optionally, the time unit for sending the uplink control information includes a time unit for sending a PUSCH, wherein the PUSCH carries the uplink control information and uplink data.

Optionally, the time unit for sending the uplink control information includes a time unit for sending a PUSCH, wherein the PUSCH only carries the uplink control information.

In an implementation mode, a channel access scheme corresponding to the reference time unit is a channel access scheme of category 4.

In S202, the terminal device determines a CWS on the unlicensed carrier according to the reference time unit.

The terminal device may determine the CWS according to a channel or a signal transmitted on the reference time unit. When channels or signals transmitted on the reference time units are different, methods for determining or adjusting a CWS are also different. HARQ-ACK information, a random access preamble, a PUSCH, or an MSG 3 in a random access process may be transmitted on the reference time unit. In following implementations, a method for determining or adjusting a CWS when Hybrid Automatic Repeat-reQuest Acknowledgement (HARQ-ACK) information is transmitted on the reference time unit, a method for determining or adjusting a CWS when a random access preamble is transmitted on the reference time unit, a method for determining or adjusting a CWS when a PUSCH is transmitted on the reference time unit, and a method for determining or adjusting a CWS when an MSG 3 in a random access process is transmitted on the reference time unit will be introduced respectively.

Optionally, the terminal device determining the CWS on the unlicensed carrier according to the reference time unit includes: the terminal device determines, according to the reference time unit and a first channel access priority, the CWS on the unlicensed carrier for channel sensing according to the first channel access priority. Optionally, the first channel access priority includes at least one of the channel access priorities in Table 1, and the first channel access priority may be denoted by p.

In an implementation of the present disclosure, the terminal device determines a reference time unit on an unlicensed carrier, and determines a CWS in a channel access scheme on the unlicensed carrier according to the reference time unit, wherein the CWS is used for performing channel sensing on the unlicensed carrier, so as to achieve amicable coexistence among various systems on the unlicensed spectrum.

Based on the method for determining a CWS shown in FIG. 2, an implementation of the present disclosure specifically describes a scheme for determining the reference time unit when an uplink grant or downlink feedback information is received on the first time domain resource.

It is assumed that the first time domain resource includes a symbol S0, and the first UL burst includes a time unit Nw. If the terminal device receives an uplink grant or downlink feedback information in the symbol S0, and a PUSCH transmitted on the time unit Nw is a latest PUSCH meeting HARQ timing sequence. A distance between a last symbol S1 of the PUSCH and the symbol S0 is greater than or equal to a first time domain duration K0.

Figure 3:
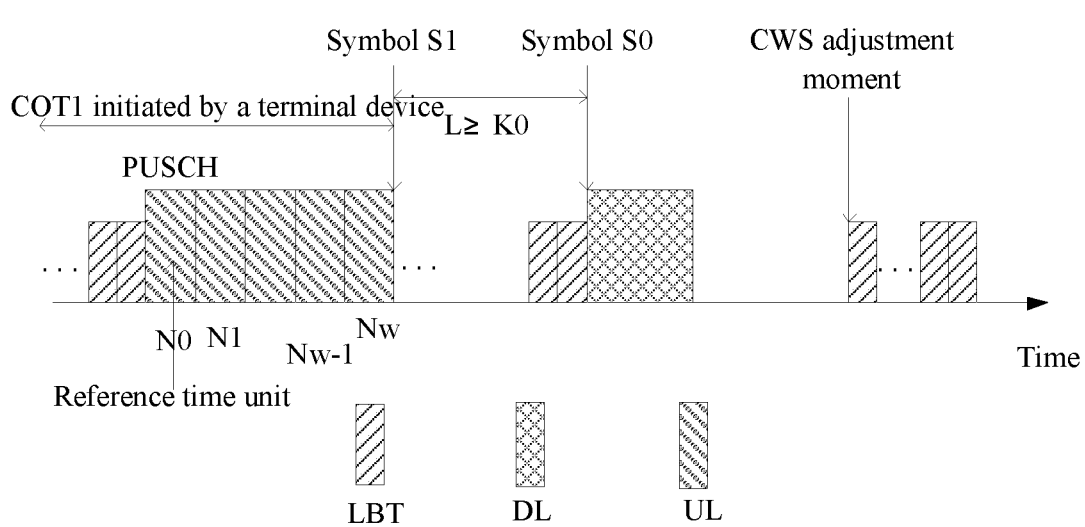
FIG. 3 is a schematic diagram of a reference time unit disclosed by an implementation of the present disclosure.

In an implementation mode, taking the schematic diagram of time units shown in FIG. 3 as an example, if the terminal device performs continuously transmission between time units N0 and Nw without gaps, or the terminal device performs transmission between time units N0 and Nw with a gap and the gap is less than or equal to a preset value such as 16 us, or the terminal device performs continuously transmission on time units N0, N1, N2, . . . , Nw, and a channel transmitted on the time unit N0 includes a complete PUSCH, then the reference time unit may include the time unit N0.

Figure 4:
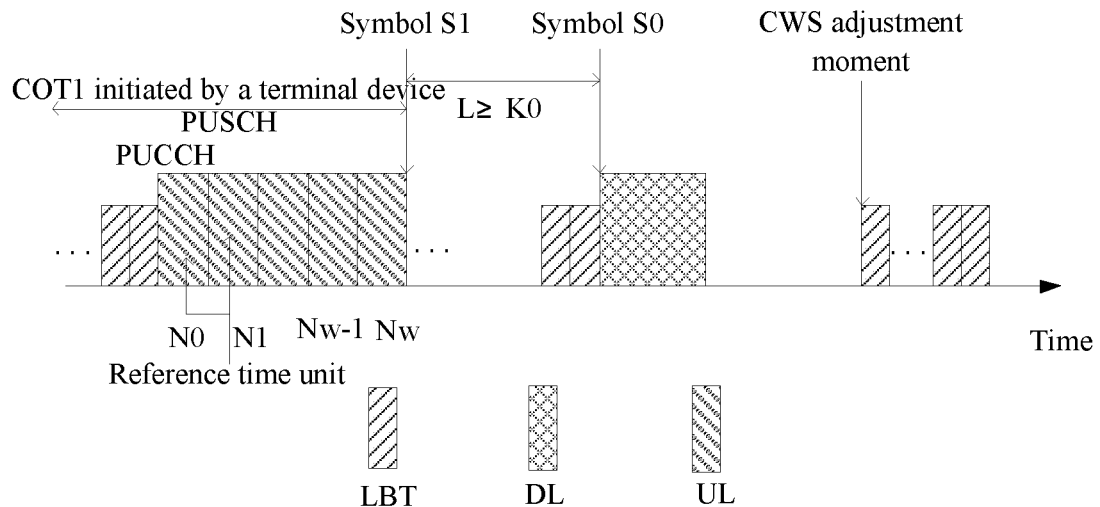
FIG. 4 is a schematic diagram of another reference time unit disclosed by an implementation of the present disclosure.

In an implementation mode, taking the schematic diagram of time units shown in FIG. 4 as an example, if the terminal device performs continuously transmission between time units N0 to Nw without gaps, or the terminal device performs transmission between the time unit N0 and the time unit Nw with a gap, and the gap is less than or equal to a preset value such as 16 us, or the terminal device performs continuously transmission on time units N0, N1, N2, . . . , Nw, and a Physical Uplink Control Channel (PUCCH), a PRACH or MSG3 in an RACH process is transmitted on the time unit N0, or part of a PUSCH is transmitted on the time unit N0, then the reference time unit may include the time unit N1. Optionally, the reference time unit may further include the time unit N0.

Figure 5:
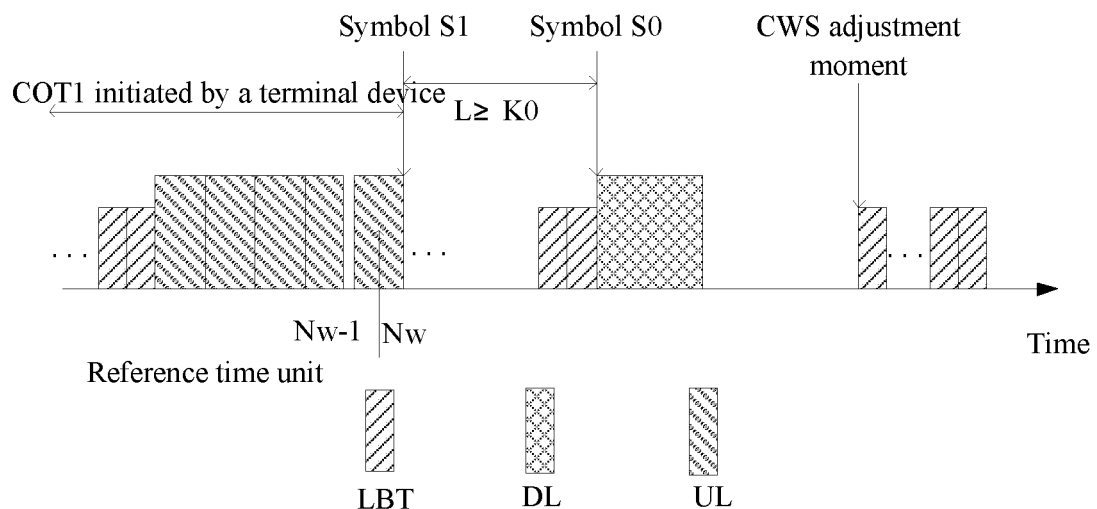
FIG. 5 is a schematic diagram of another reference time unit disclosed by an implementation of the present disclosure.

In an implementation mode, taking the schematic diagram of time units shown in FIG. 5 as an example, if the terminal device transmits between the time unit Nw−1 and the time unit Nw with a gap and the gap is larger than a preset value such as 16 us, then the reference time unit may include the time unit Nw.

Based on the method for determining a CWS shown in FIG. 2, an implementation of the present disclosure specifically describes a scheme for determining the reference time unit when an uplink grant or downlink feedback information sent by the network device is not received within the second time domain duration after transmission of the second UL burst starts.

If the terminal device does not receive an uplink grant or downlink feedback information within a second time domain duration K1 after the transmission of the second UL burst.

In an implementation mode, a first value of K1 determined after the terminal device accesses a system through an authorized carrier is less than or equal to a second value of K1 determined after the terminal device accesses the system through an unlicensed carrier.

Figure 6:
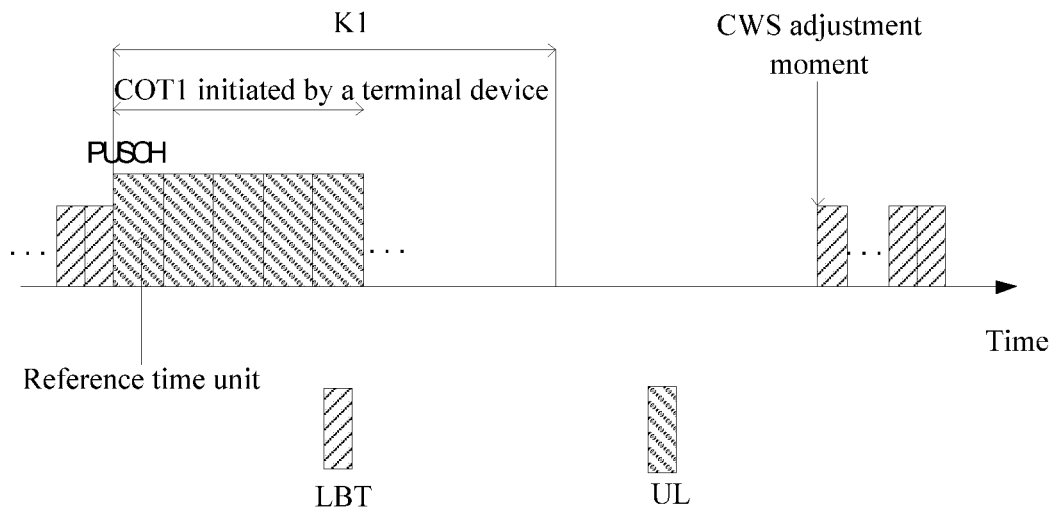
FIG. 6 is a schematic diagram of another reference time unit disclosed by an implementation of the present disclosure.

In an implementation mode, taking the schematic diagram of time units shown in FIG. 6 as an example, if a PUSCH is transmitted on the first time unit in the second UL burst, the reference time unit may include the first time unit in the second UL burst. Optionally, K1 represents a time domain duration determined with a first symbol of a PDCCH scheduling transmission of the PUSCH as a starting symbol.

In an implementation mode, if a Physical Uplink Control Channel (PUCCH) is transmitted on the first time unit in the second UL burst, and a PUSCH is transmitted on a second time unit, the reference time unit may include the second time unit in the second UL burst. Optionally, K1 represents a time domain duration determined with a first symbol of a PDCCH scheduling transmission of the PUSCH on the second time unit as a starting symbol.

Optionally, the reference time unit may further include the first time unit in the second UL burst. Optionally, K1 represents a time domain duration determined with a first symbol transmitted from a Physical Uplink Control Channel (PUCCH) on the first time unit as a starting symbol.

In an implementation mode, the reference time unit may include a first time unit transmitting a complete PUSCH in the second UL burst.

Based on a method for determining a CWS shown in FIG. 2, an implementation of the present disclosure specifically describes a scheme for determining a CWS when HARQ-ACK information is transmitted on a reference time unit.

Optionally, a channel transmitted on the reference time unit includes a Physical Uplink Control Channel (PUCCH) or Uplink Control Information (UCI) only on PUSCH, wherein the PUCCH or the UCI includes HARQ-ACK information. For example, before the terminal device determines a CWS, the HARQ-ACK information is transmitted on the reference time unit. Then, the terminal device may determine the CWS in response to the HARQ-ACK information transmitted on the reference time unit.

Optionally, a channel access scheme corresponding to the reference time unit is Cat-4 LBT.

In an implementation mode, if the terminal device receives a first downlink grant, and the first downlink grant includes new data scheduling information of a first HARQ process, and the HARQ-ACK information includes positive acknowledgement information corresponding to the first HARQ process, it is determined that the CWS is a minimum value.

For example, the terminal device sends ACK information corresponding to the first HARQ process on a reference time unit, and the terminal device receives a Downlink Grant (DL grant). If the DL grant includes new data scheduling information corresponding to the first HARQ process, then for a priority being $p \in \{1, 2, 3, 4\}$, it is set that $CW_p = CW_{min, p}$.

Taking uplink channel access parameters shown in Table 1 as an example, if the channel access priority is 1, the terminal device may adjust the CWS to 3; if the channel access priority is 2, the terminal device may adjust the CWS to 7; if the channel access priority is 3, the terminal device may adjust the CWS to 15; and if the channel access priority is 4, the terminal device may adjust the CWS to 15.

In an implementation mode, if the terminal device receives a first downlink grant and the first downlink grant does not include new data scheduling information of an HARQ process corresponding to the HARQ-ACK information, the CWS is increased or the CWS is kept unchanged. Optionally, the HARQ-ACK information includes ACK information.

For example, if the first downlink grant does not include new data scheduling information corresponding to a first HARQ process, the terminal device may increase the CWS to a next relatively large value corresponding to the channel access priority $p \in \{1, 2, 3, 4\}$ or maintain the CWS unchanged.

Taking Table 1 as an example, if the channel access priority is 1 and a CWS determined last time is 3, the terminal device may determine the CWS as 3, or 7; if the channel access priority is 2 and the CWS determined last time is 7, the terminal device may determine the CWS as 7 or 15; if the channel access priority is 3 and the CWS determined last time is 15, the terminal device may determine the CWS as 15 or 31; if the channel access priority is 4 and the CWS determined last time is 63, the terminal device may determine the CWS as 63 or 127.

Optionally, a time duration between a symbol S2 and a symbol S3 is greater than or equal to K0, wherein the symbol S2 is a symbol where the terminal device receives the DL grant, and the symbol S3 is an ending symbol where the terminal device transmits a Physical Uplink Control Channel (PUCCH) or UCI only on PUSCH.

Optionally, the DL grant may be sent through an authorized carrier or an unlicensed carrier.

In this implementation, after the terminal device transmits a PUCCH on the reference time unit, wherein the PUCCH includes ACK information, if the terminal device receives scheduling information of new data transmission of an HARQ process corresponding to the ACK information, it may indicate that the network device has successfully received the Physical Uplink Control Channel (PUCCH) on the reference time unit, that is, an interference on the channel is relatively small, so the terminal device may reduce the CWS.

In an implementation mode, if the terminal device does not receive the first downlink grant of the HARQ process corresponding to the HARQ-ACK information, the CWS is increased or the CWS is kept unchanged.

For example, when the terminal device does not receive the first downlink grant including the new data scheduling information corresponding to the first HARQ process, but plans to perform Cat-4 LBT, it may increase the CWS to a next relatively large value corresponding to the channel access priority p∈{1,2,3,4}, or maintain the CWS unchanged.

In an implementation mode, the reference time unit is located before a moment at which the terminal device receives the first downlink grant, and a time duration between an ending moment of the reference time unit and the moment at which the terminal device receives the first downlink grant is greater than or equal to the first time domain duration.

In this implementation, when the terminal device does not receive data scheduling information for an HARQ process fed back for a Physical Uplink Control Channel (PUCCH), the terminal device cannot determine whether there is no demand for downlink data transmission at present, or either the network device has not received a Physical Uplink Control Channel (PUCCH) successfully, or the network device cannot send a DL grant due to failure in accessing a downlink channel. Therefore, the CWS may be unchanged or increased in this case.

Based on a method for determining a CWS shown in FIG. 2, an implementation of the present disclosure specifically describes a scheme for determining a CWS when a random access preamble is transmitted on a reference time unit.

Optionally, a channel access scheme corresponding to the reference time unit may be Cat-4 LBT.

For example, before the terminal device determines a CWS, the random access preamble is transmitted on the reference time unit. Then, the terminal device may determine the CWS in response to the random access preamble transmitted on the reference time unit.

In an implementation mode, if the terminal device receives a second downlink grant within a random access response window, and data scheduled by the second downlink grant includes a random access response corresponding to a target Physical Random Access Channel (PRACH) resource, wherein the random access preamble is transmitted through the target PRACH resource, then it is determined that the CWS is a minimum value.

For example, if the terminal device receives a DL grant within a Random AccessResponse (RAR) window K3, and a PDSCH scheduled by the DL grant includes an RAR response corresponding to the PRACH resource, then for a priority being p∈{1,2,3,4}, it is set that $CW_p = CW_{min, p}$.

Herein, the DL grant may be sent through an authorized carrier or an unlicensed carrier.

In an implementation mode, if the terminal device receives a second downlink grant within a random access response window, and data scheduled by the second downlink grant include a random access response corresponding to the random access preamble, it is determined that the CWS is a minimum value.

In an implementation mode, if the terminal device receives a second downlink grant within a random access response window, and data scheduled by the second downlink grant include a random access response corresponding to a target PRACH resource but does not include the random access response corresponding to the random access preamble, wherein the random access preamble is transmitted through the target PRACH resource, then the CWS is increased or the CWS is kept unchanged.

For example, the terminal device receives a DL grant within an RAR window K3, and a PDSCH scheduled by the DL grant includes an RAR response corresponding to a target PRACH resource. If the RAR response includes a response for a random access preamble sent by the terminal device, then for a priority being p∈{1,2,3,4}, it is set that $CW_p = CW_{min, p}$; and/or, if the RAR response does not include a response for a random access preamble sent by the terminal device, the terminal device may increase the CWS to a next relatively large value corresponding to the priority p∈{1,2,3,4}, or maintain the CWS unchanged.

Herein, the DL grant may be sent through an authorized carrier or an unlicensed carrier.

In this implementation, after sending a random access preamble on a PRACH resource on the reference time unit, the terminal device receives a response for the PRACH resource (or the random access preamble) described above sent by the network device within an RAR window, which indicates that the network device at least has successfully received one PRACH sequence on a reference time unit, that is, an interference on this channel is relatively small, so the terminal device may reduce the CWS.

In an implementation mode, if the terminal device does not receive a second downlink grant within a random access response window, wherein the second downlink grant is used for scheduling transmission of a random access response corresponding to a target PRACH resource, and the random access preamble is transmitted through the target PRACH resource, then the CWS is increased or the CWS is kept unchanged.

Figure 7:
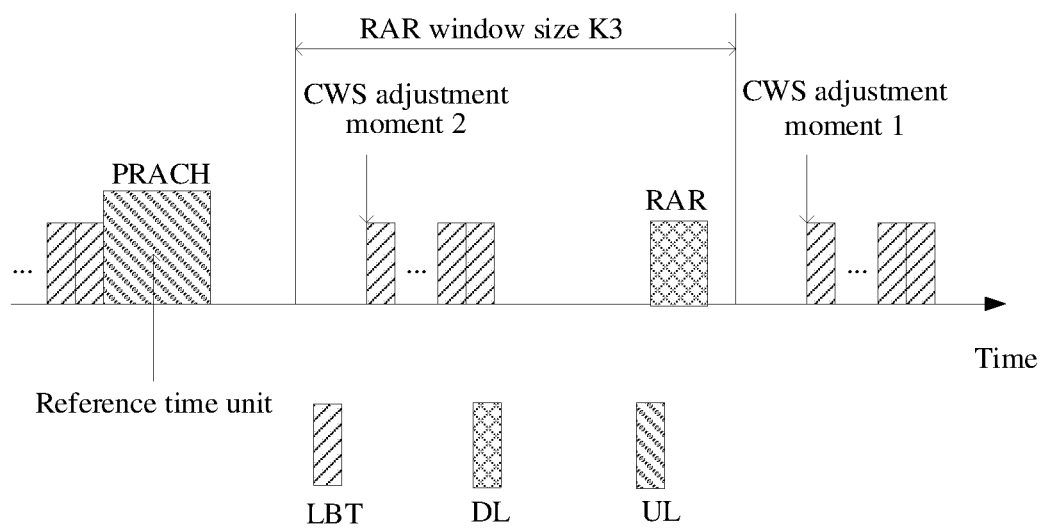
FIG. 7 is a schematic diagram of an RAR window disclosed by an implementation of the present disclosure.

Taking the schematic diagram of time units shown in FIG. 7 as an example, if the terminal device does not receive an RAR response corresponding to any PRACH resource within time of an RAR window K3, and plans to perform Cat-4 LBT after time of K3, for example, at a CWS adjustment moment 1 shown in FIG. 7, the terminal device may increase the CWS to a next relatively large value corresponding to the channel access priority p∈{1,2,3,4}, or maintain the CWS unchanged. Optionally, the CWS is adjusted only once.

In this implementation, after the terminal device sends the random access preamble on any PRACH resource on the reference time unit, it does not receive the response for the PRACH resource sent by the network device within the RAR window, which may indicate that the network device has not successfully received a PRACH sequence on the reference time unit, that is, the network device has a relatively large interference on the channel, so the terminal device may increase the CWS.

In an implementation mode, if the terminal device determines the CWS within the random access response window and does not receive a second downlink grant, wherein the second downlink grant is used for scheduling transmission of a random access response corresponding to a target PRACH resource, and the random access preamble is transmitted through the target PRACH resource, then the CWS is kept unchanged.

Taking the schematic diagram of the time units shown in FIG. 7 as an example, if the terminal device plans to perform Cat-4 LBT within time of an RAR window K3, for example, at a CWS adjustment moment 2 shown in FIG. 7, the terminal device may maintain the CWS unchanged.

In this implementation, when the terminal device performs Cat-4 LBT within an RAR window, the terminal device cannot determine whether a response for a first PRACH resource sent by the network device will be received within subsequent time in K3, and cannot determine an interference condition on the channel either, so the CWS is kept unchanged.

Based on a method for determining a CWS shown in FIG. 2, an implementation of the present disclosure specifically describes a scheme for determining a CWS when a first PUSCH is transmitted on a reference time unit. Herein, the first PUSCH corresponds to a second HARQ process.

Optionally, a channel access scheme corresponding to the first PUSCH is Cat-4 LBT.

For example, before the terminal device determines a CWS, the first PUSCH is transmitted on the reference time unit. Then, the terminal device may determine the CWS in response to the first PUSCH transmitted on the reference time unit.

In an implementation mode, if the terminal device receives a first uplink grant, and the first uplink grant includes new data transmission information for scheduling at least one HARQ process in the second HARQ process, it is determined that the CWS is a minimum value.

In an implementation mode, if the terminal device receives first downlink feedback information, and the first downlink feedback information includes positive acknowledgement (ACK) information corresponding to at least one HARQ process in the second HARQ process, it is determined that the CWS is a minimum value.

In an implementation mode, if the terminal device receives a first uplink grant and the first uplink grant does not include new data transmission information for scheduling at least one HARQ process in the second HARQ process, the CWS is increased.

In an implementation mode, if the terminal device receives first downlink feedback information and the first downlink feedback information does not include positive acknowledgement (ACK) information corresponding to at least one HARQ process in the second HARQ process, the CWS is increased.

For example, when the terminal device receives UL grant or DFI, if NDI (New Data Indicator) in at least one HARQ process corresponding to a reference HARQ process number of the terminal device is reversed, or if a HARQ-ACK value in at least one HARQ process corresponding to the reference HARQ process number indicates ACK when HARQ timing is met, then for a priority $p \in \{1,2,3,4\}$, is set that $CW_p = CW_{min,\ p}$; otherwise, the CWS is increased to a next relatively large value corresponding to the priority $p \in \{1,2,3,4\}$. Herein, the reference HARQ process number is an HARQ process number corresponding to a PUSCH transmitted on the reference time unit.

Based on a method for determining a CWS shown in FIG. 2, an implementation of the present disclosure specifically describes a scheme for determining a CWS when an MSG 3 in a random access process is transmitted on a reference time unit.

For example, before the terminal device determines a CWS, the MSG 3 in the random access process is transmitted on the reference time unit. Then, the terminal device may determine a CWS in response to the MSG 3 in the random access process transmitted on the reference time unit.

Optionally, a signal transmitted on the reference time unit is a message (MSG) 3 in a Random Access Channel (RACH) process.

Optionally, a channel access scheme corresponding to the PUSCH (i.e., the MSG 3) is Cat-4 LBT.

In an implementation mode, if the terminal device receives a third downlink grant, wherein the third downlink grant is used for scheduling transmission of a message 4 in a random access process, it is determined that the CWS is a minimum value.

For example, if the terminal device receives a DL grant scrambled by a temporary cell radio network temporary identifier (TC-RNTI) or a Cell Radio Network Temporary Identifier (C-RNTI), and the DL grant is used for scheduling transmission of a MSG4, the terminal device may determine that the CWS is a smallest CWS among CWSs corresponding to channel access priorities, or if a priority is $p \in \{1,2,3,4\}$, the terminal device may set that $CW_p = CW_{min,\ p}$. Herein, the TC-RNTI is an RNTI allocated by the network device to the terminal device in MSG2 (i.e., a random access response message).

In this implementation, in a four-step random access process, scheduling transmission of MSG4 indicates that MSG3 is decoded correctly, and a correct decoding result of MSG3 can indicate that a channel quality is good, which may be used for reducing the CWS.

In an implementation mode, if the terminal device receives a second uplink grant, wherein the second uplink grant is used for scheduling retransmission of the MSG 3, it is determined that the CWS is a minimum value.

For example, if the terminal device receives an UL grant scrambled by TC-RNTI or C-RNTI, wherein the UL grant is used for scheduling retransmission of MSG3, then for a priority being $p \in \{1,2,3,4\}$, the terminal device sets that $CW_p = CW_{min,\ p}$.

In this implementation, in a four-step random access process, collision of MSG3 may occur, so an erroneous decoding result of MSG3 may be due to a collision. However, scheduling of MSG3 being received shows that the network device can perform downlink transmission, and the channel is not congested, so the CWS may be reduced.

In an implementation mode, if the terminal device receives a second uplink grant, wherein the second uplink grant is used for scheduling retransmission of the MSG 3, the CWS is increased.

For example, if the terminal device receives a UL grant scrambled by TC-RNTI or C-RNTI, wherein the UL grant is used for scheduling retransmission of MSG3, then the terminal device increases the CWS to a next relatively large value corresponding to the channel access priority $p \in \{1,2,3,4\}$.

In this implementation, processing modes of MSG3 and an ordinary PUSCH are the same, and the CWS is increased if the decoding is erroneous.

In an implementation mode, if the terminal device receives a second uplink grant, wherein the second uplink grant is used for scheduling retransmission of the MSG 3, the CWS is kept unchanged.

For example, if the terminal device receives a UL grant of scrambled by TC-RNTI or C-RNTI, and the UL grant is used for scheduling retransmission of MSG3, then the CWS is kept unchanged.

In this implementation, in a four-step random access process, collision of MSG3 may occur, so MSG3 may not be used for CWS adjustment when its decoding result is erroneous.

In an implementation mode, if the terminal device does not receive a second uplink grant and/or a third downlink grant within a third time domain duration after ending of transmission of the MSG 3, and the CWS is determined after the third time domain duration, then the CWS is increased or the CWS is kept unchanged, wherein the third downlink grant is used for scheduling transmission of a message 4 in a random access process, and the second uplink grant is used for scheduling retransmission of the MSG 3.

For example, if the terminal device does not receive a DL grant or an UL grant scrambled by TC-RNTI or C-RNTI within the third time domain duration after ending of the transmission of MSG3 (i.e., it does not receive a response for MSG3 for the network device), and plans to perform Cat-4 LBT after the third time domain duration, then the terminal device may increase the CWS to a next relatively large value corresponding to the priority p∈{1,2,3,4}, or maintain the CWS unchanged. Optionally, the CWS adjustment is only adjusted once.

Optionally, the third time domain duration includes at least one of following cases.

The third time domain duration is preconfigured or preset through a protocol.

The third time domain duration is sent by the network device to the terminal device through indication information. For example, the network device may send indication information to the terminal device, wherein the indication information is used for indicating the third time domain duration. The terminal device may obtain the third time domain duration according to the indication information.

The third time domain duration is associated with processing capacity of the network device. The processing capability of the network device may include decoding time of a transport block. The third time domain duration may be obtained according to the processing capability of the network device. For example, the terminal device may obtain the third time domain duration according to the decoding time of the transmission block.

The third time domain duration is associated with a channel access priority. For example, the third time domain duration is determined according to a correspondence relation between the channel access priority and the third time domain duration, and different channel access priorities correspond to different third time domain durations.

In this implementation, after the terminal device sends MSG3 on a reference time unit, it does not receive the response for MSG3 sent by the network device within a preset time period, which may indicate that the network device has not successfully received MSG3 on the reference time unit or the network device does not have an opportunity to send a downlink channel, that is, the network device has a relatively great interference on the channel, so the terminal device may increase the CWS.

In an implementation mode, if the terminal device determines the CWS within a third time domain duration after ending of transmission of the MSG 3, and the terminal device does not receive the second uplink grant and/or the third downlink grant, then the CWS is kept unchanged, wherein the third downlink grant is used for scheduling transmission of a message 4 in a random access process, and the second uplink grant is used for scheduling retransmission of the MSG 3.

In an implementation mode, if the terminal device determines a CWS within the third time domain duration, the terminal device maintains the CWS unchanged.

For example, if the terminal device plans to perform Cat-4 LBT within time of K4, the CWS is kept unchanged. Herein, a method for determining the third time domain duration is same as above.

In this implementation, when the terminal device performs Cat-4 LBT within the third time domain duration, since the terminal device cannot determine whether a response for MSG3 sent by the network device will be received within subsequent time of the third time domain duration, and cannot determine an interference condition on the channel either, the CWS is kept unchanged.

Optionally, in an implementation of the present disclosure, the increase of the CWS may be increasing to a next relatively large number in a corresponding CWS range based on the current CWS, or it may be exponentially increased, for example, by a power of 2, or it may also be linearly increased, which is not limited here. Herein, if the current CWS is a maximum value in the corresponding CWS range, the increase of the CWS is to maintain the CWS to be the maximum value and unchanged, while after the maximum value of the CWS is kept for K times, the CWS is reset to an initial value, wherein K is a number determined by the terminal device from 1 to 8 according to the channel access priority.

Optionally, in an implementation of the present disclosure, determining the CWS as the minimum value may refer to setting the CWS as a minimum value in the CWS value range, such as a CWS minimum value in Table 1; or, setting the CWS as the initial value.

The foregoing describes the solutions provided in the implementations of the present disclosure mainly from a perspective of interaction between network elements. It may be understood that, in order to implement the above functions, the terminal device and the network device include corresponding hardware structures and/or software modules for performing the various functions. Those skilled in the art may easily understand that in connection with the units and algorithm actions of the examples described in the implementations disclosed herein, the present disclosure may be implemented in a form of hardware or a combination of the hardware and computer software. Whether a function is performed in a form of hardware or computer software driving hardware depends on a specific application and a design constraint condition of the technical solution. Professional technicians may use different methods to implement the described functions for each specific application, but such implementation should not be considered as going beyond the scope of the present disclosure.

Division for functional units may be performed on the terminal device in the implementations of the present disclosure according to the above method examples. For example, various functional units may be divided correspondingly to various functions, or two or more functions may be integrated into one processing unit. The above integrated unit may be implemented in a form of hardware, or may be implemented in a form of a software program module. It should be noted that, the division of the units in the implementations of the present disclosure is illustrative, and is merely a division of logical functions. Other division modes may be used in actual implementations.

Figure 8:
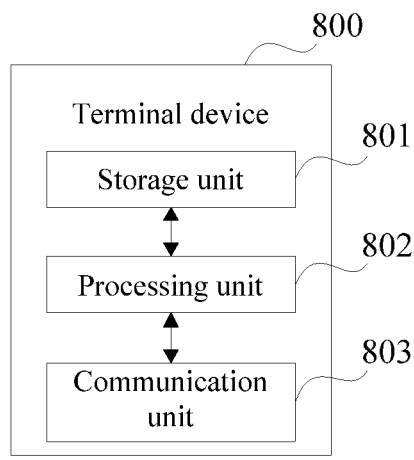
FIG. 8 is a schematic diagram of a structure of a terminal device disclosed by an implementation of the present disclosure.

In a case that an integrated unit is used, FIG. 8 illustrates a block diagram of possible composition of functional units of a terminal device related to the above implementations. The terminal device 800 includes a processing unit 802 and a communication unit 803. The processing unit 802 is configured to control and manage actions of the terminal device. For example, the processing unit 802 is configured to support the terminal device to perform acts 201 and 202 in FIG. 2 and/or another process of the techniques described in the present document. The communication unit 803 is configured to support communication between the terminal device and another device, such as communication between the terminal device and a network device. The terminal device may further include a storage unit 801, configured to store program codes and data of the terminal device.

The processing unit 802 may be a processor or a controller, the communication unit 803 may be a transceiver, a transceiving circuit, or a radio frequency chip, and storage unit 801 may be a memory.

Herein, the processing unit 802 is configured to determine a reference time unit on an unlicensed carrier, and determine a CWS on the unlicensed carrier according to the reference time unit, wherein the CWS is used for performing channel sensing on the unlicensed carrier.

In a possible example, if the communication unit 803 receives an uplink grant or downlink feedback information on a first time domain resource, the reference time unit includes a time unit in a first UL burst, wherein a time duration between an ending position of the first UL burst and a starting position of the first time domain resource is greater than or equal to a first time domain duration, and the first UL burst is a latest UL burst before the first time domain resource.

In a possible example, the first time domain duration is preconfigured or preset through a protocol; or the first time domain duration is sent by the network device to the terminal device through indication information; or the first time domain duration is associated with processing capability of the network device; or the first time domain duration is associated with a channel access priority.

In a possible example, the reference time unit includes a first time unit in the first UL burst; and/or,
the reference time unit includes a first time unit transmitting a complete PUSCH in the first UL burst.

In a possible example, the reference time unit includes a time unit in a second UL burst, wherein the communication unit 803 does not receive an uplink grant or downlink feedback information sent by the network device within a second time domain duration after transmission of the second UL burst starts.

In a possible example, the second time domain duration is preconfigured or preset through a protocol; or the second time domain duration is sent by the network device to the terminal device through indication information; or the second time domain duration is associated with processing capability of the network device; or the second time domain duration is associated with a time domain duration of the second UL burst; or the second time domain duration is associated with a channel sensing time corresponding to a CWS.

In a possible example, the reference time unit includes a first time unit in the second UL burst; and/or,
the reference time unit includes a first time unit transmitting a complete PUSCH in the second UL burst.

In a possible example, the reference time unit includes a time unit for sending a random access preamble; and/or,
the reference time unit includes a time unit for sending uplink control information.

In a possible example, a channel access scheme corresponding to the reference time unit is a channel access scheme of category 4.

In a possible example, HARQ-ACK information is transmitted on the reference time unit, and the processing unit 802 determining the CWS on the unlicensed carrier according to the reference time unit includes at least one of following cases:
  if the communication unit 803 receives a first downlink grant, and the first downlink grant includes new data scheduling information of a first HARQ process, and the HARQ-ACK information includes positive acknowledgement information corresponding to the first HARQ process, it is determined that the CWS is a minimum value;
  if the communication unit 803 receives a first downlink grant and the first downlink grant does not include new data scheduling information of an HARQ process corresponding to the HARQ-ACK information, the CWS is increased or the CWS is kept unchanged;
  if the communication unit 803 does not receive a first downlink grant of an HARQ process corresponding to the HARQ-ACK information, the CWS is increased or the CWS is kept unchanged.

In a possible example, the reference time unit is located before a moment at which the communication unit 803 receives a first downlink grant, and a time duration between an ending moment of the reference time unit and the moment at which the communication unit 803 receives the first downlink grant is greater than or equal to a first time domain duration.

In a possible example, a random access preamble is transmitted on the reference time unit, and the processing unit 802 determining the CWS on the unlicensed carrier according to the reference time unit includes at least one of following cases:
  if the communication unit 803 receives a second downlink grant within a random access response window, and data scheduled by the second downlink grant includes a random access response corresponding to a target PRACH resource, wherein the random access preamble is transmitted through the target PRACH resource, it is determined that the CWS is a minimum value;
  if the communication unit 803 receives a second downlink grant within a random access response window, and data scheduled by the second downlink grant includes a random access response corresponding to the random access preamble, it is determined that the CWS is a minimum value;
  if the communication unit 803 receives a second downlink grant within a random access response window, and data scheduled by the second downlink grant includes a random access response corresponding to a target PRACH resource but does not include a random access response corresponding to the random access preamble, wherein the random access preamble is transmitted through the target PRACH resource, then the CWS is increased or the CWS is kept unchanged;
  if the communication unit 803 does not receive a second downlink grant within a random access response window, wherein the second downlink grant is used for scheduling transmission of a random access response corresponding to a target PRACH resource, and the random access preamble is transmitted through the target PRACH resource, then the CWS is increased or the CWS is kept unchanged;
  if the communication unit 803 determines the CWS within a random access response window and does not receive a second downlink grant, wherein the second downlink grant is used for scheduling transmission of a random access response corresponding to a target PRACH resource, and the random access preamble is transmitted through the target PRACH resource, then the CWS is kept unchanged.

In a possible example, a first PUSCH is transmitted on the reference time unit, wherein the first PUSCH corresponds to a second HARQ process, and the processing unit 802 determining the CWS on the unlicensed carrier according to the reference time unit includes at least one of following cases:
  if the communication unit 803 receives a first uplink grant, and the first uplink grant includes new data transmission information for scheduling at least one HARQ process in the second HARQ process, it is determined that the CWS is a minimum value;
  if the communication unit 803 receives first downlink feedback information, and the first downlink feedback information includes positive acknowledgement (ACK) information corresponding to at least one HARQ process in the second HARQ process, it is determined that the CWS is a minimum value;

if the communication unit 803 receives a first uplink grant, and the first uplink grant does not include new data transmission information for scheduling at least one HARQ process in the second HARQ process, the CWS is increased;

if the communication unit 803 receives first downlink feedback information and the first downlink feedback information does not include positive acknowledgement (ACK) information corresponding to at least one HARQ process in the second HARQ process, the CWS is increased.

In a possible example, an MSG 3 in a random access process is transmitted on the reference time unit, and the processing unit 802 determining a CWS on the unlicensed carrier according to the reference time unit includes at least one of following cases:

if the communication unit 803 receives a third downlink grant, wherein the third downlink grant is used for scheduling transmission of a message 4 in a random access process, it is determined that the CWS is a minimum value;

if the communication unit 803 receives a second uplink grant, wherein the second uplink grant is used for scheduling retransmission of the MSG 3, it is determined that the CWS is a minimum value;

if the communication unit 803 receives a second uplink grant, wherein the second uplink grant is used for scheduling retransmission of the MSG 3, the CWS is increased or the CWS is kept unchanged.

In a possible example, an MSG 3 in a random access process is transmitted on the reference time unit, and the processing unit 802 determining the CWS on the unlicensed carrier according to the reference time unit includes at least one of following cases:

if the communication unit 803 does not receive a second uplink grant and/or a third downlink grant within a third time domain duration after ending of transmission of the MSG 3, and determines the CWS after the third time domain duration, the CWS is increased or the CWS is kept unchanged;

if the communication unit 803 determines the CWS within a third time domain duration after ending of transmission of the MSG 3, and the communication unit 803 does not receive the second uplink grant and/or the third downlink grant, the CWS is kept unchanged;

wherein, the third downlink grant is used for scheduling transmission of a message 4 in a random access process, and the second uplink grant is used for scheduling retransmission of the MSG 3.

In a possible example, the third time domain duration is preconfigured or preset through a protocol; or the third time domain duration is sent by the network device to the terminal device through indication information; or the third time domain duration is associated with processing capability of the network device.

Figure 9:
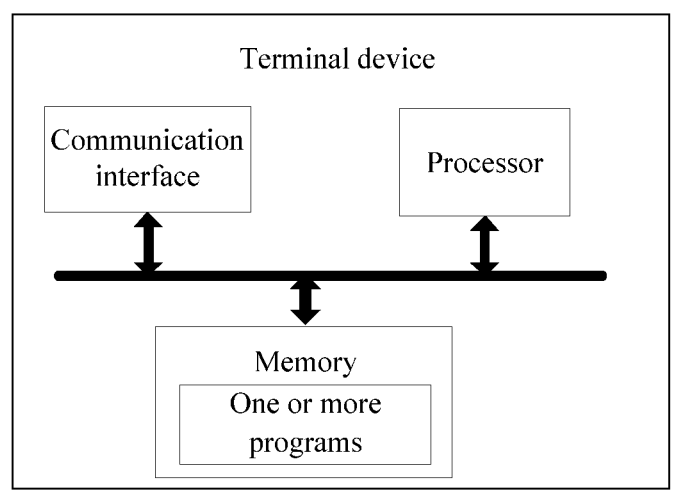
FIG. 9 is a schematic diagram of a structure of another terminal device disclosed by an implementation of the present disclosure.

When the processing unit 802 is a processor, the communication unit 803 is a communications interface, and the storage unit 801 is a memory, the terminal device related to the implementation of the present disclosure may be the terminal device shown in FIG. 9.

An implementation of the present disclosure further provides a computer readable storage medium. The computer readable storage medium stores a computer program for electronic data interchange, wherein the computer program enables a computer to execute parts or all of the acts described with the terminal device in the above method implementations.

An implementation of the present disclosure further provides a computer program product. The computer program product includes a non-transitory computer readable storage medium storing a computer program, and the computer program is operable to enable a computer to perform parts or all of the acts described with the terminal device in the above method implementations. The computer program product may be a software installation package.

The acts of the method or algorithm described in the implementations of the present disclosure may be implemented in hardware or may be implemented by a processor executing software instructions. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An example storage medium is coupled to the processor such that the processor may read information from the storage medium, and write information to the storage medium. Of course, the storage medium may be a component of the processor. The processor and the storage medium may be located in an ASIC. In addition, the ASIC may be located in an access network device, a target network device, or a core network device. Or, the processor and the storage medium may act as separate components in the access network device, the target network device, or the core network device.

Those skilled in the art should realize that in one or more examples described above, the functions described in the implementations of the present disclosure may be implemented in whole or in parts through software, hardware, firmware, or any combination thereof. When the functions described in the implementations of the present disclosure are implemented through software, these functions may be implemented in whole or in parts in the form of a computer program product. The computer program product includes one or more computer instructions. When the computer program instructions are loaded and executed on a computer, the flows or functions according to the implementations of the present disclosure are generated in whole or in parts. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that the computer may access, or a data storage device such as an integrated server or data center that includes one or more available medium. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The above specific implementations give further explanation in detail for purposes, technical solutions and beneficial effects of implementations of the present disclosure. It should be understood that the above is only the specific implementation modes of implementations of the present disclosure, and is not used to limit the protection scope of implementations of the present disclosure. Any modification, equivalent substitution, improvement and the like, made on the basis of technical solutions of implementations of the present disclosure shall be included in the protection scope of implementations of the present disclosure.

What is claimed is:

1. A method for determining a contention window size (CWS), applied to a terminal device, comprising:
   determining a reference time unit on an unlicensed carrier; and
   determining a CWS on the unlicensed carrier according to the reference time unit, wherein the CWS is used for performing channel sensing on the unlicensed carrier-,
   wherein an uplink grant or downlink feedback information is received by the terminal device on a first time domain resource, and the reference time unit comprises a time unit in a first uplink transmission burst (UL burst), wherein a time duration between an ending position of the first UL burst and a starting position of the first time domain resource is greater than or equal to a first time domain duration, and the first UL burst is a latest UL burst before the first time domain resource.

2. The method of claim 1, wherein the first time domain duration is sent by a network device to the terminal device through indication information, the indication information is used for indicating the first time domain duration.

3. The method of claim 1, wherein an MSG 3 in a random access process is transmitted on the reference time unit, and determining the CWS on the unlicensed carrier according to the reference time unit comprises:
   increasing the CWS or maintaining the CWS unchanged, if the terminal device receives a second uplink grant, wherein the second uplink grant is used for scheduling retransmission of the MSG 3.

4. The method of claim 3, wherein a channel access scheme corresponding to the MSG 3 is Category 4 Listen Before Talk (Cat-4 LBT).

5. The method of claim 1, wherein an MSG 3 in a random access process is transmitted on the reference time unit, and determining the CWS on the unlicensed carrier according to the reference time unit comprises:
   maintaining the CWS unchanged when the terminal device does not receive a second uplink grant within a third time domain duration after ending of transmission of the MSG 3, and determines the CWS after the third time domain duration.

6. The method of claim 5, wherein the third time domain duration comprises a value preconfigured or preset through a protocol.

7. A terminal device, comprising a processor, and a transceiver,
   wherein the processor is configured to determine a reference time unit on an unlicensed carrier, and determine a CWS on the unlicensed carrier according to the reference time unit, wherein the CWS is used for performing channel sensing on the unlicensed carrier; and
   wherein the transceiver is configured to receive an uplink grant or downlink feedback information on a first time domain resource, and the reference time unit comprises a time unit in a first uplink transmission burst (UL burst), wherein a time duration between an ending position of the first UL burst and a starting position of the first time domain resource is greater than or equal to a first time domain duration, and the first UL burst is a latest UL burst before the first time domain resource.

8. The terminal device of claim 7, wherein the first time domain duration is sent by a network device to the terminal device through indication information, the indication information is used for indicating the first time domain duration.

9. The terminal device of claim 7, wherein an MSG 3 in a random access process is transmitted on the reference time unit, and the processor determining a CWS on the unlicensed carrier according to the reference time unit comprises:
   increasing the CWS or maintaining the CWS unchanged, if the communication unit receives a second uplink grant, wherein the second uplink grant is used for scheduling retransmission of the MSG 3.

10. The terminal device of claim 9, wherein a channel access scheme corresponding to the MSG 3 is Category 4 Listen Before Talk (Cat-4 LBT).

11. The terminal device of claim 7, wherein an MSG 3 in a random access process is transmitted on the reference time unit, and the processor determining a CWS on the unlicensed carrier according to the reference time unit comprises:
   maintaining the CWS unchanged when the transceiver does not receive a second uplink grant within a third time domain duration after ending of transmission of the MSG 3, and determines the CWS after the third time domain duration.

12. The terminal device of claim 11, wherein the third time domain duration comprises a value preconfigured or preset through a protocol.

* * * * *